United States Patent [19]

Murphey et al.

[11] Patent Number: 5,128,390

[45] Date of Patent: Jul. 7, 1992

[54] METHODS OF FORMING CONSOLIDATABLE RESIN COATED PARTICULATE MATERIALS IN AQUEOUS GELS

[75] Inventors: Joseph R. Murphey; Kenneth Totty, both of Duncan, Okla.

[73] Assignee: Halliburton Company, Duncan, Okla.

[21] Appl. No.: 644,060

[22] Filed: Jan. 22, 1991

[51] Int. Cl.⁵ .......................... C09K 7/00; C08G 59/14
[52] U.S. Cl. ................................. 523/130; 523/131; 523/402; 523/403; 523/414; 523/417
[58] Field of Search .............. 523/130, 131, 402, 403, 523/414, 417

[56] References Cited

U.S. PATENT DOCUMENTS

| 4,074,760 | 2/1978 | Copeland et al. | 166/276 |
| 4,199,484 | 4/1980 | Murphey | 260/13 |
| 4,247,430 | 1/1981 | Constien | 523/425 |
| 4,259,205 | 3/1981 | Murphey | 252/326 |
| 4,829,100 | 5/1989 | Murphey et al. | 523/131 |
| 4,942,186 | 7/1990 | Murphey et al. | 523/131 |

*Primary Examiner*—Paul R. Michl
*Assistant Examiner*—Christopher P. Rogers
*Attorney, Agent, or Firm*—Thomas R. Weaver

[57] ABSTRACT

Improved methods of forming and suspending consolidatable resin composition coated particulate materials in gelled aqueous carrier liquids are provided. In accordance with the methods, a gelled aqueous carrier liquid, uncoated particulate material, a resin composition which will subsequently harden and a surface active agent are admixed whereby the particulate material is coated with the resin composition and suspended in the gelled aqueous carrier liquid.

20 Claims, No Drawings

METHODS OF FORMING CONSOLIDATABLE RESIN COATED PARTICULATE MATERIALS IN AQUEOUS GELS

BACKGROUND OF THE INVENTION

1. Field of the Invention

This invention relates generally to methods of forming consolidatable resin coated particulate materials in aqueous gels, and more particularly, to improved methods of continuously coating a particulate material such as sand with a hardenable resin composition in the presence of an aqueous gel whereby the resin coated particulate material can be placed in a subterranean formation and consolidated therein.

2. Description of the Prior Art

Methods of continuously forming and transporting consolidatable resin coated particulate materials in aqueous gels have been developed and used heretofore. The methods are particularly useful in treating subterranean formations containing loose or incompetent sands which migrate with hydrocarbons produced therefrom in that the resin coated sands suspended in aqueous gels can be placed in the subterranean formations and consolidated therein. The resulting consolidated, permeable, particulate mass placed between the producing formation and the well bore penetrating the formation prevents the loose or incompetent sands from being carried into the well bore.

The originally developed methods of placing resin coated particulate material into subterranean formations involved the batch mixing of component streams. For example, U.S. Pat. No. 4,074,760 issued Feb. 21, 1978 discloses a method of forming a consolidated particulate mass in a subterranean formation wherein resin coated sand is suspended in a gelled aqueous carrier liquid. The carrier liquid is introduced into a subterranean zone whereby the resin coated sand is deposited and subsequently consolidated therein. The carrier liquid and the resin coated sand are prepared by batch mixing of components.

U.S. Pat. No. 4,199,484 discloses a method of preparing a suspension of a particulate material coated with an epoxy resin in a gelled aqueous carrier liquid wherein the coating of the sand is carried out in the gelled aqueous carrier liquid. The gelled carrier liquid, sand and other components are first combined followed by the addition of the epoxy resin with mixing whereby the epoxy resin coats the sand. Once coating has taken place, the slurry is introduced into a subterranean zone.

More recently, methods of continuously forming and transporting resin coated particulate materials in aqueous gels have been developed and used. For example, U.S. Pat. No. 4,829,100 issued May 9, 1989 discloses a method whereby a stream of gelled aqueous carrier liquid is substantially continuously mixed with particulate material, a resin composition and a surface active agent. The particulate material is continuously coated with the resin and suspended in the gelled aqueous carrier liquid, and a substantially continuous stream of the gelled aqueous carrier liquid containing the resin coated particulate material is introduced into a subterranean zone. The resin on the coated particulate material is then allowed to harden whereby the resin coated sand is consolidated into a hard permeable mass in the formation.

While the methods of continuously forming and transporting resin coated particulate materials in aqueous gels described in U.S. Pat. No. 4,829,100 have been utilized successfully, the surfactants utilized in accordance with the methods are generally incompatible with other surfactants which could be advantageously used as oil-water de-emulsifiers, foaming agents and the like, particularly when polysaccharide gelling agents such as guar gum and derivatives thereof are used.

Thus, there is a need for an improved method of continuously forming and transporting resin coated particulate materials in aqueous carrier liquids gelled with polysaccharide gelling agents including guar gum and derivatives thereof wherein other oil-water de-emulsifying surfactants, foaming surfactants and the like can be included in the carrier liquid.

SUMMARY OF THE INVENTION

The present invention fulfills the need mentioned above by providing an improved method of continuously forming and transporting resin coated particulate materials in aqueous gels wherein the carrier liquid-resin coated particulate material mixture is compatible with and can include other desired surfactants. The method basically comprises admixing an aqueous carrier liquid gelled with a polysaccharide gelling agent, e.g., a guar gum derivative, with uncoated particulate material, a polyepoxide resin composition which will subsequently harden and an improved surfactant selected from the group consisting of a tertiary amine having the formula $R_1R_2R_3N$ wherein $R_1$ is an alkyl radical having from about 8 to about 12 carbon atoms, $R_2$ is methyl, ethyl, hydroxyethyl or benzyl and $R_3$ is methyl, ethyl or hydroxyethyl and the zwitterionic reaction product (a betaine) formed from the reaction of the above described tertiary amine with chloroacetic or chloropropionic acid.

The above described components as well as additional components and other surfactants for foaming the mixture, preventing oil-water emulsions from occurring in the subterranean formation, etc. can be substantially continuously mixed and introduced into a subterranean formation over the period of time necessary to deposit a desired quantity of resin coated particulate material in the formation. The resin on the coated particulate material is then allowed to harden whereby the deposit is consolidated into a hard permeable mass in the formation.

The objects, features and advantages of the present invention in addition to those described above will be readily apparent to those skilled in the art upon a reading of the description of preferred embodiments which follows.

DESCRIPTION OF PREFERRED EMBODIMENTS

In accordance with the improved methods of the present invention, a substantially continuous stream of particulate material, e.g., sand, is coated with a continuous stream of a polyepoxide resin composition which will subsequently harden and simultaneously suspended in a gelled aqueous carrier liquid. The substantially instantaneous coating of the particulate material with resin is made possible by the presence of an improved surfactant (surface active agent) which is also continuously added to the gelled aqueous carrier liquid-resin-particulate material mixture. Because the improved surfactant is compatible with oil-water de-emulsifying surfactants, foaming surfactants and the like, the inclusion of such other surfactants in the mixture is made possible. The hardenable resin composition which is utilized for coating the particulate material has a sufficiently long curing time to enable the continuous introduction of the suspension of resin coated particulate material in gelled aqueous carrier liquid into a desired location in a subterranean zone whereby the coated particulate material is deposited therein. The subsequent hardening of the resin in the zone produces a hard permeable mass of consolidated particulate material which prevents the migration of loose or incompetent sand from the formation into the well bore penetrating the formation.

The aqueous carrier liquid gelled with a polysaccharide gelling agent utilized in accordance with this invention can be formed using fresh water, brine or sea water. A variety of polysaccharide gelling agents can be used, and those having molecular weights in the range of from about 100,000 to about 4,000,000 are generally suitable. Preferably, a polysaccharide polymer is utilized having a molecular weight of from about 600,000 to about 2,400,000. The polymers preferably include substituents such as hydroxyethyl to give the necessary water hydration and gel characteristics whereby a clear aqueous gel is produced having a viscosity of at least about 30 centipoises on a Fann V.G. meter at 300 rpm. Examples of polysaccharide polymers which can be utilized include substituted carboxy and hydroxy alkyl cellulose, such as hydroxyethylcellulose and carboxymethylhydroxyethylcellulose, and guar gum and its derivatives such as hydroxypropylguar. Most preferably, the gelling agent is hydroxypropylguar or carboxymethylhydroxypropylguar having a molecular weight in the range of from about 100,000 to about 4,000,000, and having a propylene oxide substitution (M.S.) of about 0.1 to about 0.7 moles of propylene oxide per mole of mannose and galactose in the guar.

The gelled aqueous carrier liquid is prepared by combining the polysaccharide gelling agent utilized with the aqueous liquid used in an amount in the range of from about 20 to about 120 lbs of polymer per 1000 gallons of aqueous liquid. The gelled aqueous carrier liquid should have a viscosity in the range of from about 10 centipoises to about 400 centipoises. Most preferably, the gelled aqueous carrier liquid includes from about 30 to about 50 lbs of hydroxypropylguar gelling agent per 1000 gallons of water, brine or sea water, and has a viscosity in the range of from about 15 to about 100 centipoises.

A gel breaker for breaking the gel and reducing the viscosity of the aqueous carrier liquid at a time substantially coincident with the placement of the coated particulate material is preferably included in the gelled aqueous carrier liquid. As a result of the breaking of the gel, the carrier liquid reverts to a low viscosity liquid which readily separates from the deposited coated particulate material and leaks off into the permeable strata surrounding the deposited particulate material. While a variety of gel breakers well known to those skilled in the art can be utilized, an enzyme-type breaker such as cellulase for a substituted cellulose gelling agent and a hemicellulase for a substituted guar gelling agent are preferred. The gelled aqueous carrier liquid can also be crosslinked with a suitable crosslinking agent. Examples of crosslinking agents which can be used are titanium lactate, titanium triethanolamine, aluminum acetate and zirconium salts. As is well known to those skilled in the art, depending upon the particular crosslinker used, a pH buffering agent may also be required.

The particulate material used in accordance with the present invention is usually sand. However, other types of particulate material such as glass beads, sintered bauxite, etc. can be used if desired. Preferably, the particulate material is of a particle size in the range of from about 10 to about 70 mesh, U.S. Sieve Series. When the particulate material is sand, a particular particle size within the broad range mentioned above is utilized depending upon the particle size and distribution of formation sand adjacent to which the resin coated sand is to be deposited. The particulate material used is combined with the gelled aqueous carrier liquid in an amount in the range of from about 2 to about 20 lbs of sand per gallon of gelled aqueous carrier liquid. Most preferably, the sand is present in the mixture in an amount in the range of from about 3 to about 15 lbs per gallon of carrier liquid.

The preferred resin composition for use in accordance with this invention is a polyepoxide resin composition which will subsequently harden. The composition substantially instantaneously coats the particulate material in the presence of the gelled aqueous carrier liquid when a surface active agent which will be described hereinbelow is also present. The hardenable polyepoxide resin composition is generally comprised of a solvent system for the resin, a hardening agent, a coupling agent and a hardening rate controller. The resin composition is generally mixed with the aqueous carrier liquid in an amount in the range of from about 1 to about 20 lbs of resin composition per each 100 lbs of particulate material contained in the carrier liquid.

While various polyepoxide resins can be utilized, preferred such resins are the condensation product of epichlorohydrin and bisphenol A. A commercially available such resin is marketed by the Shell Chemical Company of Houston, Texas, under the tradename EPON 828.

In a preferred embodiment, the solvent system for the resin is comprised of a first, polar, organic, diluent which is miscible with the polyepoxide resin and substantially immiscible in water, and a second polar, organic, diluent which is miscible with but substantially non-reactive with the polyepoxide resin. The first and second diluents are present in the resin composition in amounts sufficient to adjust the viscosity of the resin composition to a level in the range of from about 100 centipoises to about 800 centipoises at ambient temperature.

In a most preferred solvent system, the first polar organic diluent is reactive with the polyepoxide resin and substantially insoluble in water and the second polar organic diluent is substantially non-reactive and also substantially insoluble in water. The preferred first polar organic diluent which is reactive with the polyepoxide resin component is selected from the group consisting of butyl glycidyl ether, cresol glycidyl ether, alkyl glycidyl ether, phenyl glycidyl ether or any other glycidyl ether which is miscible with the polyepoxide resin used. Of these, butyl glycidyl ether is the most preferred. The reactive diluent reacts with the resin and the hardening agent, and also functions to reduce the viscosity of the polyepoxide resin.

The second polar organic diluent which is non-reactive with the polyepoxide resin component also contributes to the lowering of the viscosity of the resin, and, in combination with the surfactant utilized, brings about the substantially instantaneous coating of the particulate material with the resin in the presence of the gelled aqueous carrier liquid. The preferred non-reactive diluent is of low molecular weight, is miscible with the polyepoxide resin, is substantially insoluble in water and is selected from the group consisting of components having the structural formulae:

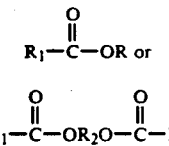

wherein:
R is $(C_nH_{2n+1})$ and n is an integer in the range of from about 1 to 5;
$R_1$ is $(C_mH_{2m+1})$ and m is 0 or an integer in the range of from 1 to about 4, or $R_1$ is

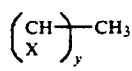

wherein y is an integer in the range of from 1 to about 4 and X is independently H or OH; and
$R_2$ is $C_aH_{2}a$ and a is an integer in the range of from 2 to about 5.

Of the various compounds falling within the group described above, ethyl acetate, butyl lactate, ethyl lactate, amyl acetate, ethylene glycol diacetate and propylene glycol diacetate are preferred. Of these, butyl lactate is the most preferred.

Various hardening agents can be utilized in the polyepoxide resin composition. Examples are amines, polyamines, amides and polyamides. A more preferred hardening agent is methylene dianiline, either dissolved in a suitable solvent such as ethyl acetate or in a liquid eutectic mixture of amines diluted with methyl alcohol. A particularly preferred hardening agent is a liquid eutectic mixture of amines diluted with about 22% by weight methyl alcohol, the mixture containing about 79% by weight methylene dianiline with the remaining amines being comprised of primary aromatic amines and meta-phenylene diamine. Such a liquid eutectic mixture is commercially available under the tradename TONOX 22 from the Uniroyal Chemical Company of Naugatuck, Connecticut.

The particular quantity of hardening agent required is dependent upon the particular hardening agent used. Generally, the hardening agent is utilized in an amount in the range of from about 2 to about 150 parts by weight per 100 parts by weight of polyepoxide resin. When an aromatic amine is utilized as the hardening agent, it is generally present in the resin composition in an amount in the range of from about 8 to about 50 parts by weight per 100 parts by weight of polyepoxide resin. Methylene dianiline is generally used in an amount of from about 25 to about 38 parts by weight per 100 parts by weight of epoxide resin, and dimethylaminomethyl substituted phenol is used in an amount of from about 2 to about 15 parts by weight per 100 parts by weight of epoxide resin.

The resin composition also preferably includes a resin-to-particulate material coupling agent such as a functional silane. Preferably, a N-beta-(aminoethyl)-gammaaminopropyltrimethoxysilane coupling agent is included in the resin composition in an amount in the range of from about 0.1 to about 2 parts by weight per 100 parts by weight of the epoxide resin used. A commercially available such silane is available from the Union Carbide Company of Danbury, Connecticut, under the trade designation Silane A-1120.

The resin composition can also include hardening rate controllers, i.e., retarders or accelerators, to lengthen or shorten the working and cure times of the resin composition. When retarders are used, low molecular weight organic acid ester retarders are preferred. Examples are alkyl esters of low molecular weight alkyl acids containing about 2 to 3 carbon atoms. Suitable accelerators include 2,4,6-trisdimethylaminomethylphenol, the ethyl hexonate salt thereof, and weak organic acids such as fumeric, erythorbic, ascorbic, salicylic and maleic acids. When a retarder or accelerator is utilized, it is combined with the resin composition in an amount up to about 0 to 10 parts by weight per 100 parts by weight of epoxide resin.

A preferred polyepoxide resin composition for use in accordance with the present invention is comprised of a resin which is the condensation product of epichlorohydrin and bisphenol A, a substantially water insoluble reactive diluent comprised of butyl glycidyl ether or cresol glycidyl ether present in an amount in the range of from about 2 to about 35 parts by weight, a substantially water insoluble non-reactive diluent comprised of butyl lactate present in an amount in the range of from about 4 parts to about 12 parts by weight and a hardening agent comprised of a water soluble solvent diluted liquid eutectic mixture of primary aromatic amines, methylene dianiline and meta-phenylene diamine present in an amount in the range of from about 25 parts by weight to about 45 parts by weight. The resin composition has a viscosity in the range of from about 150 centipoises to about 400 centipoises, and has an approximate working time without retarders or accelerators, i.e., a time period between mixing and when the viscosity of the composition exceeds about 1500 centipoises, of about 2 hours at normal ambient conditions. The cure time for the resin composition, i.e., the time from when the viscosity reaches about 1500 centipoises to when the resin composition has fully hardened is about 80 hours at 72° F.

The most preferred resin composition for use in accordance with the present invention is comprised of an epichlorohydrin and bisphenol A condensation polyepoxide resin (100 parts by weight), butyl glycidyl ether present in an amount of about 11 parts by weight, butyl lactate present in an amount of about 8 parts by weight, a liquid eutectic mixture of primary amines, methylene dianiline and metaphenylene diamine diluted with about 22% by weight methyl alcohol present in an amount of about 36 parts by weight, N-beta(aminoethyl)-gamma-aminopropyltrimethoxysilane present in an amount of about 0.8 parts by weight, and the ethylhexonate salt of dimethylaminomethylphenol present in an amount of about 7 parts by weight. This resin composition has a viscosity of about 200 centipoises, a working time of about 0.5 hours and a cure time of about 8 hours at 80° F. When the accelerator (ethylhexonate salt of dimethylaminomethylphenol) is not present in the composition, it has a working time of about 2 hours and a cure time of about 84 hours at 80° F.

The surfactant is the component in the mixture of gelled aqueous carrier liquid, particulate material, a polyepoxide resin composition and surfactant which primarily brings about the substantially instantaneous coating of the particulate material with the polyepoxide resin in the presence of the gelled aqueous carrier liquid. In accordance with the present invention, an improved surfactant is utilized which is of a shorter chain length, and therefore, a greater water solubility than the heretofore utilized surfactants. As a result, the surfactant is compatible with other surfactants useful as oil-water de-emulsifiers, foaming agents and the like which heretofore could not be used in the gelled aqueous carrier liquid-particulate material-resin-surfactant mixture, particularly when the aqueous carrier liquid was gelled with a guar gelling agent.

In accordance with the present invention, a surfactant is utilized selected from:

a tertiary amine having the formula

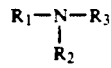

wherein $R_1$ is an alkyl radical having from about 8 to about 12 carbon atoms, $R_2$ is methyl, ethyl, hydroxyethyl or benzyl, and $R_3$ is methyl, ethyl or hydroxyethyl; or the zwitterionic reaction product (a betaine) formed from the reaction of a tertiary amine having the formula

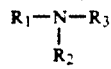

wherein $R_1$, $R_2$ and $R_3$ are defined as above with chloracetic or chloropropionic acid.

Examples of preferred tertiary alkyl amine surfactants which can be utilized are capryldimethylamine, decylmethylbenzylamine, and dodecyldimethylamine. Of these, dodecydimethylamine is the most preferred.

It has been found that when a tertiary alkyl amine is utilized as the surfactant, its effectiveness is increased by blending it with an ethoxylated fatty alcohol having from about 30 to about 40 moles of ethylene oxide per mole of alcohol. Preferred such alcohols are oleyl poly-(ethyleneoxy) alcohol, and stearyl poly(ethyleneoxy) alcohol, and the tertiary alkyl amine is preferably present in the amineethoxylated alcohol blend in an amount in the range of from about 5 to about 10% by weight of the blend.

The zwitterionic surfactant is prepared by reacting 1 mole of either chloroacetic acid or chloropropionic acid with each mole of the tertiary amine utilized at a temperature of about 160° F. The resulting betaine surfactant is zwitterionic over the pH range typically utilized (5.5 to 9.5). Examples of preferred such surfactants are decyldimethylbetaine, dodecyldimethylbetaine and cocodimethylbetaine. Of these, cocodimethylbetaine is the most preferred.

The surfactant utilized is mixed with the gelled aqueous carrier liquid, the polyepoxide resin composition and the particulate material in an amount in the range of from about 0.25 to about 10 gallons of surfactant per 1000 gallons of gelled aqueous carrier liquid. Most preferably, when a hydroxypropylguar gelling agent is used, the surfactant is present in the mixture in an amount in the range of from about 0.5 to about 2.5 gallons per 1000 gallons of aqueous liquid.

It has been found that the coating of the particulate material with the resin composition is improved when the mixture of gelled aqueous liquid, particulate material, resin composition and surfactant includes an aliphatic alcohol which is only slightly water soluble, i.e., on the threshold of water solubility. Suitable such aliphatic alcohols are isoamyl alcohol and isohexyl alcohol. When utilized, the alcohols are added to the carrier liquid-particulate material-resin-surfactant mixture in an amount in the range of from about 1 to about 2.5 gallons per 1000 gallons of aqueous carrier liquid.

In carrying out the method of the present invention, an aqueous gelled carrier liquid is first prepared by combining the polysaccharide gelling agent used with the water used. A substantially continuous stream of the aqueous gelled carrier liquid is conducted to a continuous stream mixing tub or the equivalent apparatus wherein it is mixed with a substantially continuous stream of liquid surface active agent of the type described above. A substantially continuous stream of particulate material is also conducted to the mixing tub as is a substantially continuous stream of premixed liquid polyepoxide resin composition of the type described above. A gel breaker and other optional components utilized are conducted to the mixing tub, and a substantially continuous stream of the resulting mixture is withdrawn therefrom and pumped by way of a conduit system down the well bore into a subterranean zone wherein the resin coated particulate material is deposited and consolidated into a hard permeable mass.

The resin coated particulate material can be utilized in the performance of gravel packing procedures or as a proppant material in fracturing treatments performed in a subterranean formation. The resin coated particulate material can also be utilized in the formation of controled permeability synthetic formations within a subterranean zone.

The continuous stream of gelled aqueous carrier liquid containing suspended resin coated particulate material formed is generally insensitive to variations in pH within the range of from about 5 to about 8.5 and variations in temperature within the range of from about 45° F. to about 100° F. The cure time of the resin composition can be short, i.e., less than about 6 hours, and the resin composition can acquire substantial strength rapidly, i.e., within a time period of about 12 hours or less.

As is well understood by those skilled in the art, it may be desirable to condition the formation adjacent the consolidation placement location by preflushing the formation. Also, after flushes may be used to insure uniform placement, consolidation and maximum permeability of the deposited particulate material as well as of particulate material existing in the formation.

In order to further illustrate the methods of the present invention and facilitate a clear understanding thereof, the following examples are given.

EXAMPLE I

A standard gel was made using 1 liter of tap water, 20 g of commercial potassium chloride and 4.8 g of a commercial hydroxypropylguar gelling agent. 1 cc of a commonly used commercial oil-water non-emulsifier surfactant mixture available from the Halliburton Company of Duncan, Oklahoma, under the trademark LO-SURF ®-300 was blended into the gel.

The gel was split into two 500 cc portions, and to one portion was added 0.5 cc of the cationic and non-cationic surfactant mixture described in U.S. Pat. No. 4,829,100 issued May 9, 1989 which is incorporated herein by reference, i.e., a blend of amyl alcohol, a cationic surfactant and a non-cationic surfactant. To the other portion of gel was added 1.5 cc of a surfactant of the present invention, i.e., cocodimethylbetaine.

A 200 cc portion of each gel described above was placed in a blender and mixed with 200 g of 20/40 mesh Ottawa sand for about 30 seconds. Following the sand, 5 cc of the resin composition described in Table 1 below was added, and the mixture was stirred for an additional 3 minutes. The resulting mixtures were each packed into a glass tube previously treated with a mold release compound. The mixtures were cured in the tubes for 24 hours at a temperature of 120° F., removed from the glass tubes and tested for compressive strength. The results are given in Table 2 below.

TABLE 1

| Resin Composition Components | Amount, parts by weight |
|---|---|
| Polyepoxide Resin[1] | 60.0 |
| Butyl Lactate | 5.0 |
| Butyl Glycidyl Ether | 6.0 |
| Hardner[2] | 21.0 |
| Coupling Agent[3] | 0.5 |
| Methyl Alcohol | 7.5 |

[1]Epon 828 (Shell Chemical Co.)
[2]Liquid eutectic mixture of aromatic amines
[3]Silane A-1120 (Union Carbide Co.)

TABLE 2

| Surfactant Used in Mixture | Compressive Strength, psi |
|---|---|
| Cationic and non-cationic surfactant mixture of USPN 4,829,100 | less than 100 |
| cocodimethylbetaine | 523 |

From Table 2 it can be seen that the surfactant of the present invention is effective in the presence of an oil-water non-emulsifier surfactant while the surfactant of U.S. Pat. No. 4,829,100 is not.

Examples II and III, below, illustrate the compatibility of the surfactant of this invention with concentrated liquid gelling agents.

EXAMPLE II 3.6 g of a commercial natural guar is slurried in 4.0 cc of diesel oil with 0.4 cc of organophillic clay dispersing agent and a non-ionic phenol-formaldehyde based ethoxylated non-emulsifying agent to form a liquid gel concentrate. The liquid gel concentrate was then used to form a gel by adding 7.2 cc of the concentrate to 1 liter of tap water containing 10 g of sodium chloride and 0.6 g of sodium bicarbonate. To 250 cc of the resulting gel was added 240 g of 20/40 mesh Ottawa sand and 7.5 cc of the resin composition described in Example I above. An enzyme gel breaker sufficient to reduce the viscosity of the gel to 3 cp in 4 hours was also added as was 1.5 cc of a blend of cocodimethylbetaine surfactant, isoamyl alcohol and 40 mole ethoxylated oleyl alcohol. The resulting slurry was poured into a glass tube and cured for 24 hours at 160° F. The compressive strength of the resulting consolidation was determined to be 1670 psi.

EXAMPLE III

The procedure described in Example II was repeated except that the gel concentrate was a hydroxypropyl guar concentrate prepared by slurrying 3.6 g of a commercial hydroxypropyl guar gelling agent with 0.1 g of a hydrophobic silica dispersing agent, 0.5 cc of a polyacrylic dispersing agent and a non-ionic phenol-formaldehyde based ethoxylated non-emulsifier. The compressive strength of the resulting consolidation was 2500 psi.

While presently preferred embodiments of the invention have been described herein, it is to be understood that modifications and changes can be made in the methods and compositions of the present invention without departing from the spirit or scope of the invention as set forth in the following claims.

What is claimed is:

1. A method of forming consolidatable resin coated particulate material in a gelled aqueous carrier liquid comprising admixing:
   (a) an aqueous carrier liquid gelled with a polysaccharide gelling agent;
   (b) uncoated particulate material;
   (c) a polyepoxide resin composition which will subsequently harden; and
   (d) a surfactant selected from the group consisting a tertiary amine having the formula $R_1R_2R_3N$ wherein $R_1$ is an alkyl radical having from about 8 to about 12 carbon atoms, $R_2$ is methyl, ethyl, hydroxyethyl or benzyl and $R_3$ is methyl, ethyl or hydroxyethyl and the zwitterionic reaction product (a betaine) formed from the reaction of the above described tertiary amine with chloroacetic or chloropropionic acid.

2. The method of claim 1 wherein said polyepoxide resin composition is comprised of a hardenable polyepoxide resin, a hardening agent for said resin, a substantially water insoluble reactive diluent for said resin and a substantially water insoluble non-reactive diluent for said resin, said reactive and non-reactive diluents being present in said resin composition in amounts sufficient to lower the viscosity thereof to a level in the range of from about 100 to about 800 centipoises at ambient temperature.

3. The method of claim 2 wherein said substantially water insoluble reactive diluent is selected from the group consisting of butyl glycidyl ether, cresol glycidyl ether, alkyl glycidyl ether and phenyl glycidyl ether.

4. The method of claim 3 wherein said substantially water insoluble non-reactive diluent is selected from the group consisting of ethyl acetate, butyl lactate, ethyl lactate, amyl acetate, ethylene glycol diacetate and propylene glycol diacetate.

5. The method of claim 4 wherein said polyepoxide resin is comprised of the condensation product of epichlorohydrin and bisphenol A.

6. The method of claim 5 wherein said hardening agent is a liquid eutectic mixture of methylene dianiline and meta-phenylene diamine diluted with a water soluble solvent.

7. The method of claim 6 wherein said reactive diluent is present in an amount of from about 2 to about 35 parts per 100 parts by weight of said polyepoxide resin and said non-reactive diluent is present in an amount of from about 4 to about 20 parts per 100 parts by weight of said polyepoxide resin.

8. The method of claim 1 wherein said polysaccharide gelling agent is selected from the group of guar gum and derivatives thereof.

9. The method of claim 1 wherein said mixture is further characterized to include a slightly soluble aliphatic alcohol having from about 5 to about 8 carbon atoms.

10. The method of claim 9 wherein said aliphatic alcohol is selected from the group consisting of isoamyl alcohol and isohexyl alcohol.

11. The method of claim 1 wherein said surfactant is a tertiary alkyl amine and said surfactant is blended with at least one ethoxylated fatty alcohol having from about 30 to about 40 moles of ethyleneoxide.

12. The method of claim 11 wherein said surfactant is dodecyldimethylamine blended with oleyl poly(ethyleneoxy) alcohol.

13. The method of claim 1 wherein said surfactant is cocodimethylbetaine.

14. A method of continuously forming consolidatable resin coated particulate material in a gelled aqueous carrier liquid comprising admixing:
   (a) an aqueous carrier liquid gelled with hydroxypropyl guar gelling agent;
   (b) uncoated sand;
   (c) a resin composition which will subsequently harden comprised of the condensation product of epichlorohydrin and bisphenol A, a hardening agent comprised of a liquid eutectic mixture of primary aromatic amines, methylene dianiline and meta-phenylene diamine diluted with a water soluble solvent, a reactive diluent for said resin comprised of butyl glycidyl ether and a non-reactive diluent for said resin comprised of butyl lactate, said reactive and non-reactive diluents being present in said resin composition in amounts sufficient to lower the viscosity thereof to from about 150 centipoises to about 500 centipoises; and
   (d) a surfactant selected from the group consisting of a tertiary amine having the formula $R_1R_2R_3N$ wherein $R_1$ is an alkyl radical having from about 8 to about 12 carbon atoms, $R_2$ is methyl, ethyl, hydroxyethyl or benzyl and $R_3$ is methyl, ethyl or hydroxyethyl and the zwitterionic reaction product (a betaine) formed from the reaction of the above described tertiary amine with chloroacetic or chloropropionic acid.

15. The method of claim 14 wherein said mixture is further characterized to include a slightly soluble aliphatic alcohol.

16. The method of claim 14 wherein said surfactant is a tertiary alkyl amine and said surfactant is blended with at least one ethoxylated fatty alcohol having from about 30 to about 40 moles of ethyleneoxide per mole of alcohol.

17. The method of claim 16 wherein said surfactant is dodecyldimethylamine blended with oleyl poly(ethyleneoxy) alcohol.

18. The method of claim 17 wherein said mixture is further characterized to include an aliphatic alcohol selected from the group consisting of isoamyl alcohol and isohexyl alcohol.

19. The method of claim 14 wherein said surfactant is cocodimethylbetaine.

20. The method of claim 19 wherein said mixture is further characterized to include an aliphatic alcohol selected from the group consisting of isoamyl alcohol and isohexyl alcohol.

* * * * *